United States Patent
Gupta et al.

(10) Patent No.: US 6,678,166 B1
(45) Date of Patent: Jan. 13, 2004

(54) DETACHABLE FACE PLATE FOR AUTOMOTIVE ELECTRONIC COMPONENTS

(75) Inventors: Vineet Gupta, Noblesville, IN (US); Brian Alan Cotterman, Sharpsville, IN (US); Sameer Gupta, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 74 days.

(21) Appl. No.: 09/689,720

(22) Filed: Oct. 13, 2000

(51) Int. Cl.⁷ .............................. H05K 5/00; H05K 5/04; H05K 5/06
(52) U.S. Cl. ........................ 361/759; 361/814
(58) Field of Search ................. 361/814, 861, 361/796, 759; 248/27.1–27.3; 307/10.1–10.2; 369/75.1, 75.2

(56) References Cited

U.S. PATENT DOCUMENTS

| | | | |
|---|---|---|---|
| 5,245,511 A | * 9/1993 | Watanabe | 361/814 |
| 5,493,479 A | * 2/1996 | Takahashi | 361/814 |
| 5,510,957 A | * 4/1996 | Takagi | 361/814 |
| 5,637,928 A | * 6/1997 | Nakajima et al. | 307/10.2 |
| 5,852,594 A | * 12/1998 | Kaise et al. | 369/75.1 |

* cited by examiner

*Primary Examiner*—Evan Pert
*Assistant Examiner*—Tuan Dinh
(74) *Attorney, Agent, or Firm*—Stefan V. Chimielewski

(57) ABSTRACT

An automotive electronic component (10), including a base component (12), a face plate (14) detachable from the base component (12), a cantilever element (16) positioned on either the base component (12) or the face plate (14), and a rib element (18) positioned on the other of the base component (12) or the face plate (14). During removal of the face plate (14) from the base component (12), the rib element (18) engages the cantilever element (16) and prevents complete disengagement of the face plate (14) from the base component (12) until an additional force is applied to the face plate (14).

17 Claims, 2 Drawing Sheets

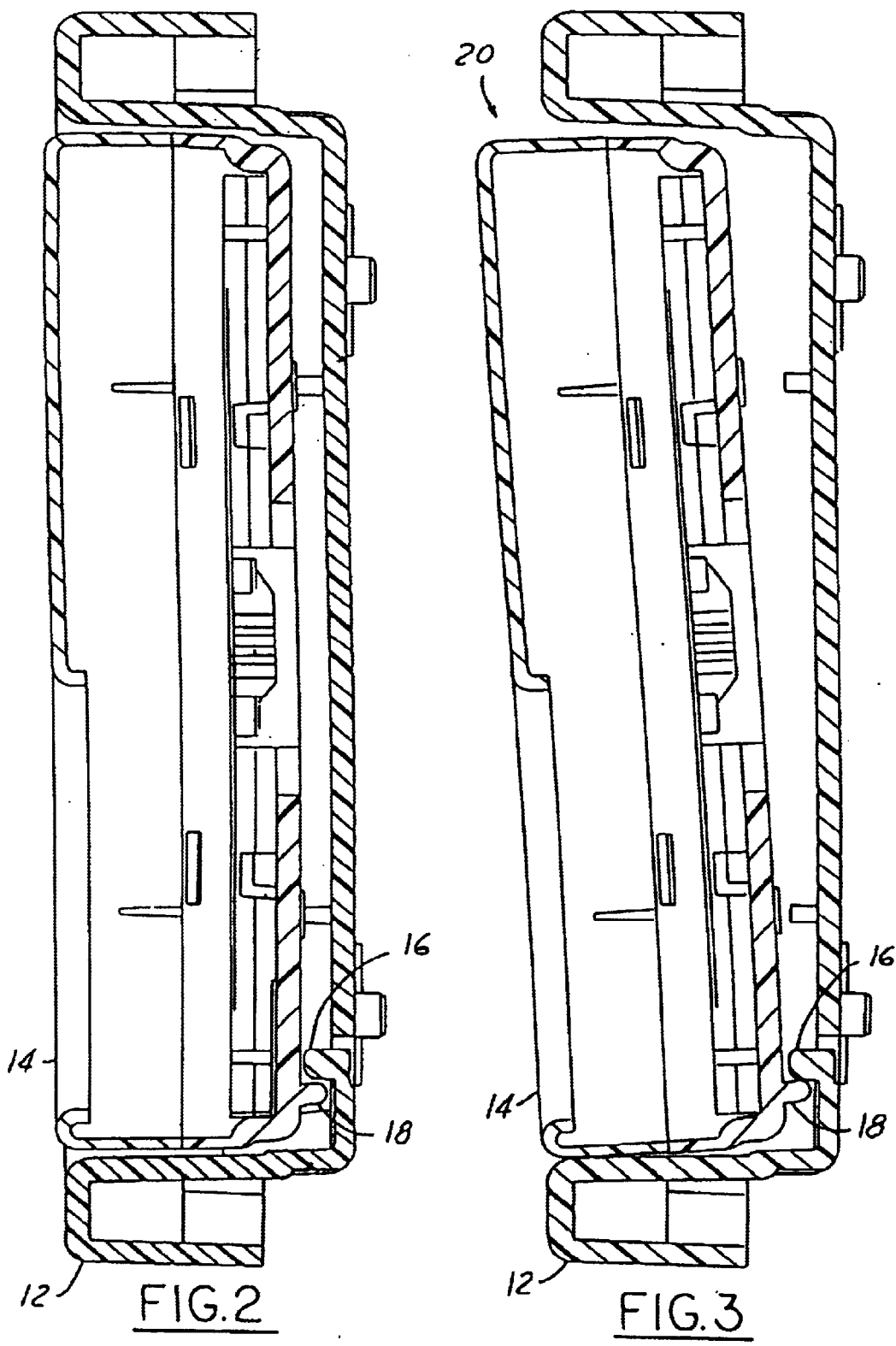

DETACHABLE FACE PLATE FOR AUTOMOTIVE ELECTRONIC COMPONENTS

TECHNICAL FIELD

The present invention relates generally to a detachable face plate for use with automotive electronic components and more particularly to a detachable face plate with improved functionality.

BACKGROUND ART

Modern automotive electronic components have increased sophistication and cost. The loss of such components due to theft is an ongoing concern for both consumers and automotive component designers. Theft of accessories such as stereo components, remote communication components, and a variety of other electronic components has prompted design changes to such components in order to incorporate anti-theft systems.

One known anti-theft system is the use of detachable face plates on electronic components. Detachable face plates allow the consumer to remove the control portion of a component (commonly an automotive stereo systems) without removing the entire component. This provides anti-theft protection in several ways. The removal of the face plate gives the appearance to potential criminals that the component is not present in the automobile. In addition, theft of the component without the detachable face plate often renders the component worthless.

Although the use of a detachable face plate is known to provide valuable anti-theft properties to electronic components, it can also create disadvantages. One known disadvantage involves the removal of the face plate from the electronic component. Often, detachable face plates are detached from their underlying components through the use of an eject button. Without special design considerations, however, the face plate can often fall away from the underlying component during the removal process. This can have the undesired effect of requiring the use of two hands to remove the face plate. Often the tendency to fall away from the main component can be further exacerbated if the vehicle is positioned on an incline.

Often, in order to prevent the face plate from falling off the component during the removal process, the component is designed with multiple-piece retaining mechanisms. These mechanisms are undesirable since they can increase the cost of the electronic component. In addition, the design of multi-piece retaining mechanisms can increase the incidents of failure for the electronic component. This can have the undesirable characteristic of increasing repair costs and decreasing customer satisfaction.

It would therefore be highly desirable to have a detachable face plate that would prevent the face plate from falling away from the component during removal, would allow for one hand operation during removal, would not result in increased construction or warranty costs, and would operate even while the vehicle is on an incline.

SUMMARY OF THE INVENTION

It is therefore an object of the present invention to provide an automotive electronic component with a detachable face plate with improved functionality.

It is a further object of the present invention to provide an automotive electronic component with a detachable face plate that allows for one hand operation without increased construction or warranty costs.

In accordance with the objects of this invention, an automotive electronic component with a detachable face plate is provided. The automotive electronic component includes a base component. The automotive electronic component further includes a face plate which is detachable from the base component. A cantilever element is positioned on either the base component or the face plate. A rib element is positioned on the other of the base component or the face plate. During removal of the face plate from the base component, the rib element engages the cantilever element and prevents the complete disengagement of the face plate from the base component until an additional force is applied to the face plate. This allows one handed removal of the face plate from the base component.

Other objects and features of the present invention will become apparent when viewed in light of the detailed description of the preferred embodiment when taken in conjunction with the attached drawings and appended claims.

BRIEF DESCRIPTION OF DRAWINGS

FIG. 2 is a cross-sectional illustration of an automotive electronic component as shown in FIG. 1; and FIG. 3 is a cross-sectional illustration of an automotive electronic component as shown in FIG. 1 illustrating the partial disengagement of the face plate from the base component.

DESCRIPTION OF THE PREFERRED EMBODIMENT(S)

Figure 1:
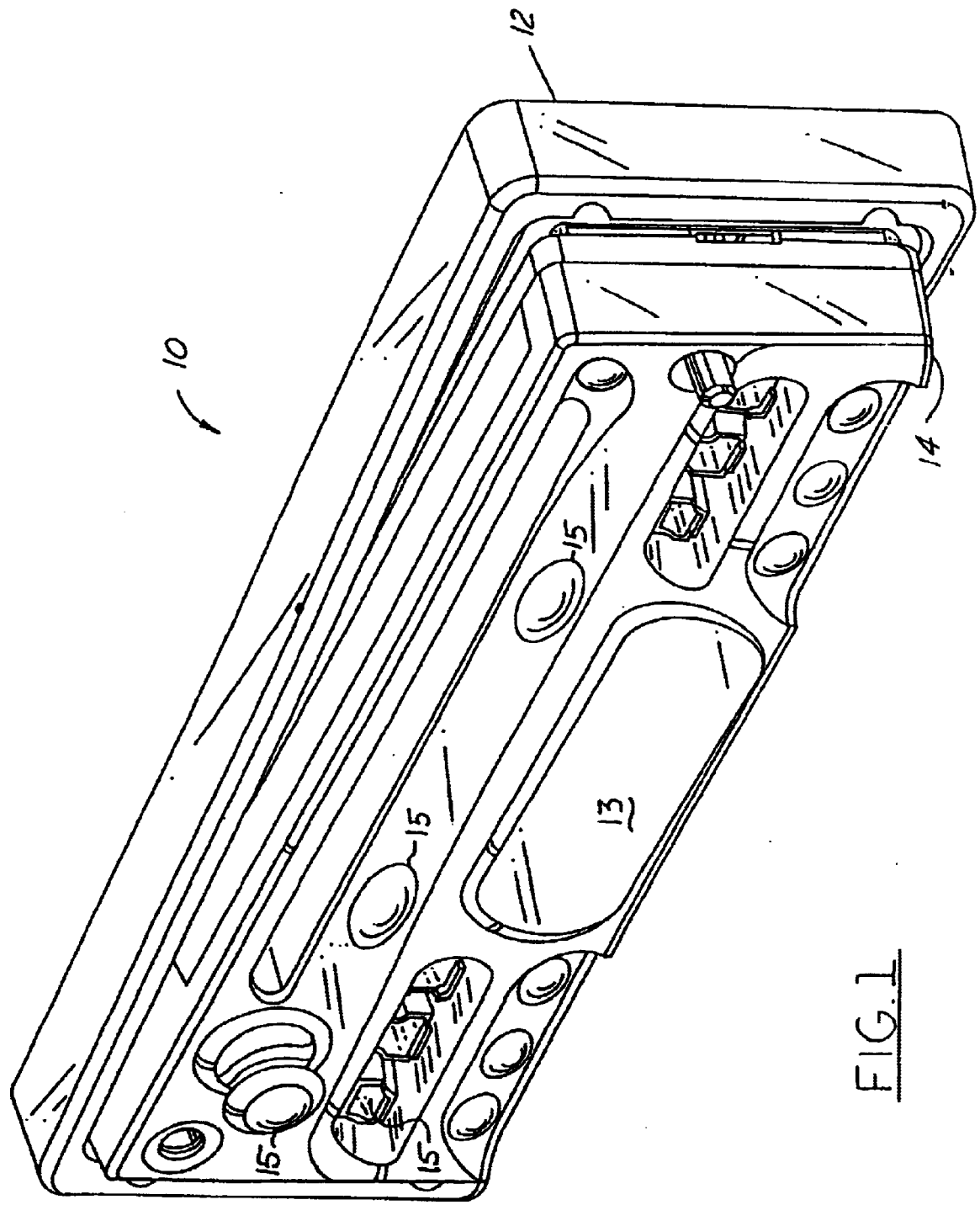
FIG. 1 is an illustration of an automotive electronic component in accordance with the present invention.

Referring now to FIG. 1, which is an illustration of an automotive electronic component 10 in accordance with the present invention. The automotive electronic component 10 is illustrated as an automotive stereo system. In alternate embodiments, however, the automotive electronic component 10 can be a wide variety of automotive electronic components including, but not limited to, automotive communication packages such as On-star, global positioning systems, or automotive information systems.

The automotive electronic component 10 includes a base component 12 and a face plate 14. The face plate 14 is detachable from the base component 12 to provide anti-theft protection for the automotive electronic component 10. In one embodiment, the base component 12 contains the majority of the functional circuitry for the automotive electronic component 10, while the face plate 14 contains the display 13 and controls 15. In alternate embodiments, however, the circuitry and controls may be distributed between the two elements in a variety of fashions. The use of such detachable face plates 14 and base components 12 are well known in the art.

Referring now to FIG. 2. The automotive electronic component 10 further includes a cantilever element 16 and a rib element 18. In one embodiment, the cantilever element 16 is positioned on the base component 12 and the rib element 18 is positioned on the face plate 14. In alternate embodiments, however, the cantilever element 16 can be positioned on the face plate 14 and then the rib element 18 will be respectively positioned on the base component 12. The rib element 18 and the cantilever element 16 can be molded directly into the face plate 14 and the base component 12, respectively, to further reduce manufacturing cost and complexity. The cantilever element 16 and the rib element 18 are positioned such that when the consumer initiates the removal of the face plate 14 from the base component 12, the rib element 18 engages the cantilever element 16 and prevents complete detachment of the face plate 14 from the base component 12 until an additional force is applied to the face plate 12 (see FIG. 3). Although the rib element 18 and the cantilever element 16 are illustrated in a particular shape, it should be understood that a wide variety of shapes are contemplated.

In this fashion, the consumer can activate any of a variety of releasing mechanisms (not shown) well known in the prior art, and yet the face plate 14 will not completely disengage from the base component 12 until an additional force is applied. This facilitates one hand operation by the consumer. Furthermore, the present invention will function even when the automobile is positioned at a variety of angles, such as on a sharp incline. In addition, the use of the cantilever element 16 and the rib element 18 provides and inexpensive, simple and reliable method of construction allowing for potential reductions in construction costs and warranty concerns. In one embodiment, the additional force is applied by the consumer simply pulling the face plate 14 off the base component 12. In other embodiments, however, the additional force can be applied by a variety of known methods including, but not limited to, any mechanical or electronic means.

In one embodiment, when the rib element 18 engages the cantilever element 16, the face plate 14 is held at an angle to the base component 12. This provides a convenient surface 20 for the consumer to grip the face plate 14 during removal. This further increases the ability of the consumer to remove the face plate 14 using only a single hand.

While particular embodiments of the invention have been shown and described, numerous variations and alternate embodiments will occur to those skilled in the art. Accordingly, it is intended that the invention be limited only in terms of the appended claims.

What is claimed is:

1. An automotive electronic component comprising:
   a base component; and
   a face plate which is detachable from said base component;
   a cantilever element mounted on said base component;
   a rib element rigidly mounted on said face plate;
   wherein during removal of said face plate from said base component, said rib element engages said cantilever element and prevents complete disengagement of said face plate from said base component until an additional force is applied to said face plate.

2. An automotive electronic component as described in claim 1, wherein said face plate comprises a plurality of controls for the automotive electronic component.

3. An automotive electronic component as described in claim 1, wherein said face plate comprises a display for the automotive electronic component.

4. An automotive electronic component as described in claim 1 for use in a automotive stereo system.

5. An automotive electronic component as described in claim 1 wherein when said rib element engages said cantilever element, said face plate is held at an angle to said base component.

6. An automotive electronic component as described in claim 1 wherein when said rib element is molded directly into said face plate.

7. An automotive electronic component as described in claim 1 wherein when said cantilever element is molded directly into said base component.

8. An automotive electronic component as described in claim 1 wherein said additional force comprises pulling on said face plate.

9. An automotive electronic component comprising:
   a base component; and
   a face plate which is detachable from said base component;
   a cantilever element mounted on said face plate;
   a rib element rigidly mounted on said base component;
   wherein during removal of said face plate from said base component, said rib element engages said cantilever element and prevents complete disengagement of said face plate from said base component until an additional force is applied to said face plate.

10. An automotive electronic component as described in claim 9, wherein said face plate comprises a plurality of controls for the automotive electronic component.

11. An automotive electronic component as described in claim 9, wherein said face plate comprises a display for the automotive electronic component.

12. An automotive electronic component as described in claim 9 for use in a automotive stereo system.

13. An automotive electronic component as described in claim 9 wherein when said rib element is molded directly into said base component.

14. An automotive electronic component as described in claim 9 wherein when said cantilever element is molded directly into said face plate.

15. An automotive electronic component as described in claim 9 wherein said additional force comprises pulling on said face plate.

16. An automotive electronic component as described in claim 9 wherein when said rib element engages said cantilever element, said face plate is held at an angle to said base component.

17. A method of controlling the removal of a face plate from a base component for an automotive electronic component comprising:
   engaging a rib element, rigidly mounted on the face plate, with a cantilever element mounted on the base component; and
   utilizing the interference between said rib element and said cantilever element to prevent complete disengagement of the face plate from the base component without an additional force being applied to the face plate.

* * * * *